(12) United States Patent
Noda et al.

(10) Patent No.: US 9,292,542 B2
(45) Date of Patent: Mar. 22, 2016

(54) INFORMATION PROCESSING APPARATUS AND METHOD AND NON-TRANSITORY COMPUTER READABLE MEDIUM

(71) Applicant: FUJI XEROX CO., LTD., Minato-ku, Tokyo (JP)

(72) Inventors: Shinpei Noda, Kanagawa (JP); Yuichi Oneda, Kanagawa (NP); Kenichiro Fukuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 173 days.

(21) Appl. No.: 14/021,238

(22) Filed: Sep. 9, 2013

(65) Prior Publication Data

US 2014/0207732 A1 Jul. 24, 2014

(30) Foreign Application Priority Data

Jan. 22, 2013 (JP) .................................. 2013-009433

(51) Int. Cl.
G06F 17/30 (2006.01)
G06F 3/0484 (2013.01)

(52) U.S. Cl.
CPC ...... *G06F 17/30277* (2013.01); *G06F 3/04842* (2013.01); *G06F 17/30345* (2013.01)

(58) Field of Classification Search
CPC ......................... G06F 17/30277; G06F 3/04842
See application file for complete search history.

(56) References Cited

U.S. PATENT DOCUMENTS

2011/0154174 A1* 6/2011 Liu et al. ........................ 715/205

FOREIGN PATENT DOCUMENTS

JP 2003-271650 9/2003
JP 2011-135556 A 7/2011

OTHER PUBLICATIONS

Japanese Office Action (Notification of Reasons for Refusal) issued Dec. 15, 2015, in Japanese application 2013-009433.

* cited by examiner

*Primary Examiner* — William Spieler
(74) *Attorney, Agent, or Firm* — Sughrue Mion, PLLC

(57) ABSTRACT

An information processing apparatus includes a display controller that displays, on a display, an image showing a designated area designated by a user in an image being processed and an image showing an area registered in a database; an updating unit that, in response to an updating operation performed by the user for updating the designated area, specifies a candidate area for the designated area and updates the specified candidate area as the designated area; and a registering unit that registers the designated area in the database in response to a registering operation performed by the user for registering the designated area. In response to the updating operation, when at least part of the candidate area covers a predetermined area or an area larger than that of an area registered in the database, the updating unit does not update the candidate area as the designated area.

10 Claims, 11 Drawing Sheets

8a

| MARKER AREA (r, p) | FEATURE AMOUNT | LINK DATA |
|---|---|---|
| (r1, p1) | FEATURE AMOUNT A | www.xxx.co.jp |
| .... | .... | .... |

INFORMATION PROCESSING APPARATUS AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-009433 filed Jan. 22, 2013.

BACKGROUND

Technical Field

The present invention relates to an information processing apparatus and method, and a non-transitory computer readable medium.

SUMMARY

According to an aspect of the invention, there is provided an information processing apparatus including a display controller, an updating unit, and a registering unit. The display controller displays, on a display, an image showing a designated area that is an area designated by a user in an image being processed and an image showing an area registered in a database. In response to an updating operation performed by the user for updating the designated area, the updating unit specifies a candidate area serving as a candidate for the designated area and updates the specified candidate area as the designated area. The registering unit registers the designated area in the database in response to a registering operation performed by the user for registering the designated area. In response to the updating operation, when at least part of the candidate area covers a predetermined area or an area larger than the predetermined area of an area registered in the database, the updating unit does not update the candidate area as the designated area.

BRIEF DESCRIPTION OF THE DRAWINGS

An exemplary embodiment of the present invention will be described based on the following figures, wherein.

DETAILED DESCRIPTION

Hereinafter, an exemplary embodiment of the invention will be described in detail with reference to the drawings.

Figure 1:
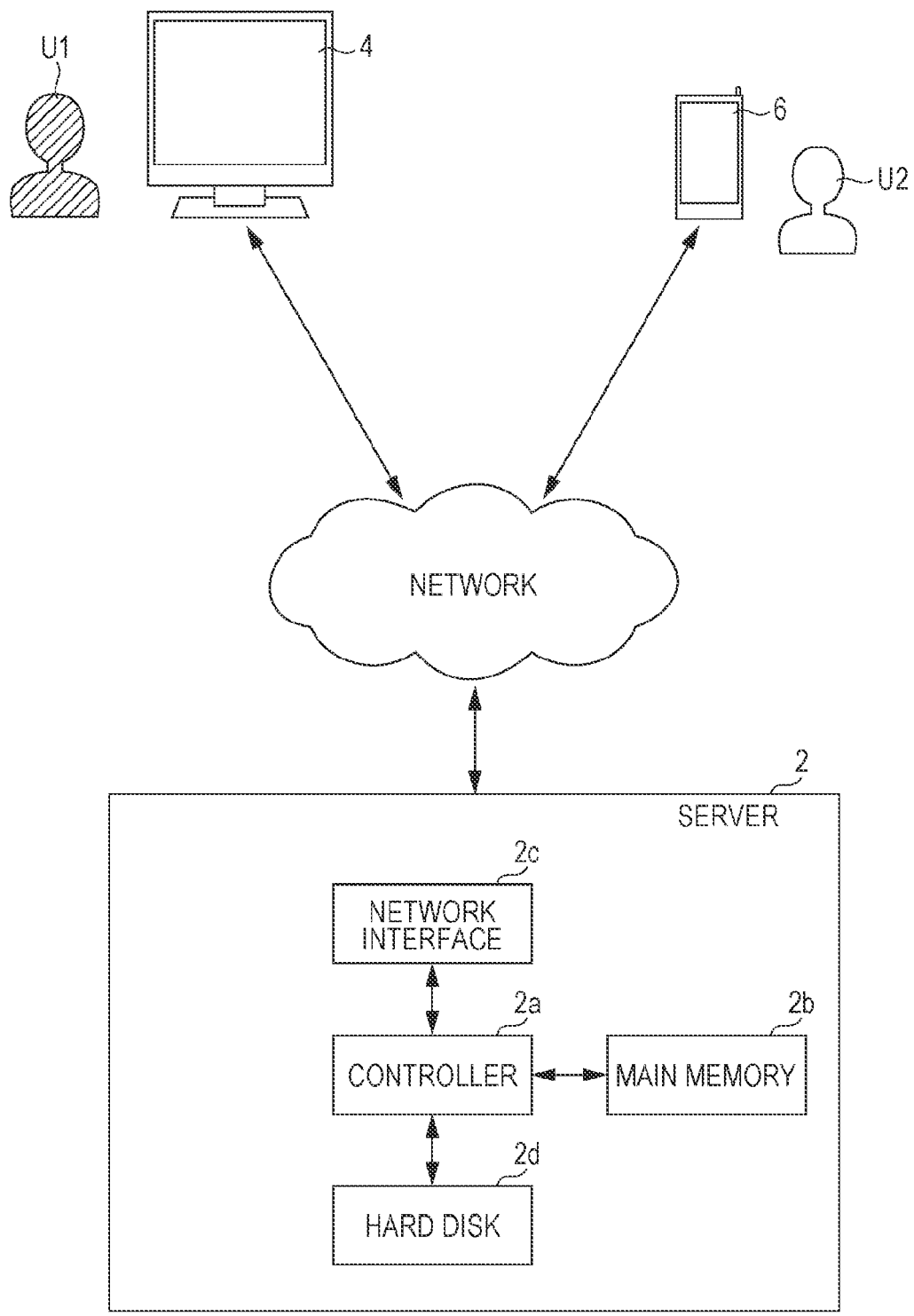
FIG. 1 is a diagram showing the configuration of an information processing apparatus (server)

FIG. 1 is a diagram showing an example of the configuration of an information processing apparatus according to an exemplary embodiment of the invention. In the exemplary embodiment, the information processing apparatus is realized as a server 2 including a controller 2a, a main memory 2b, a network interface 2c, a hard disk 2d, and the like. The controller 2a is a microprocessor and executes various types of information processing in accordance with a program stored in the main memory 2b. The main memory 2b is realized by a read-only memory (ROM) and a random-access memory (RAM) and stores the above-described program. Here, the program is read from a computer-readable information storage medium (such as a digital versatile disc (DVD) (registered trademark)-ROM) and stored in the main memory 2b. Alternatively, the program may be downloaded via a network and stored in the main memory 2b.

The main memory 2b also stores information necessary for various types of information processing and functions as a work memory.

The network interface 2c is an interface for connecting the server 2 to the network. The network interface 2c sends information to the network or receives information from the network in accordance with a command from the controller 2a. As shown in FIG. 1, an information terminal 4 of a user U1 and a mobile terminal 6 of a user U2 are connected to the network. The server 2 is capable of communicating with the information terminal 4 and the mobile terminal 6 via the network. Here, the user U1 is an employee of a certain company A. An application provided by the company A that may be free of charge is installed in the mobile terminal 6.

Figures 2, 3:
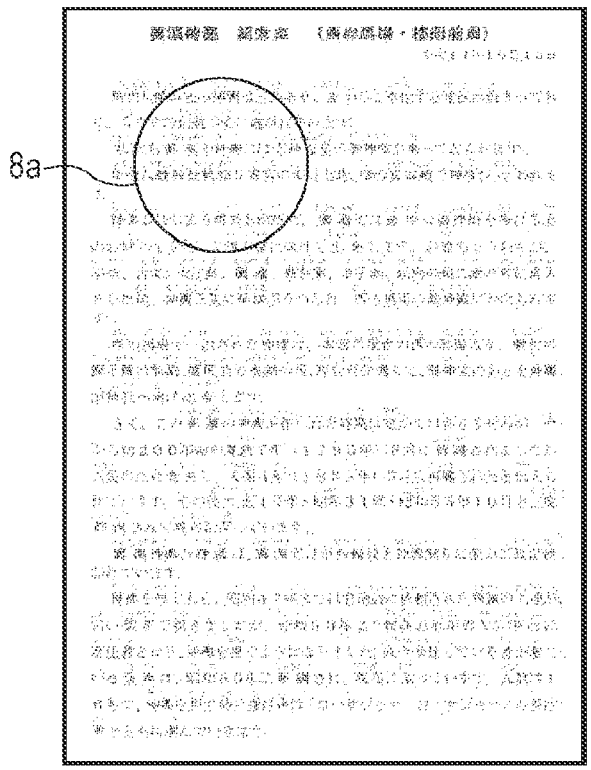
FIG. 2 is a diagram showing an example of a document image.
FIG. 3 is a diagram showing an example of content stored in a database.

The hard disk 2d stores various types of information. In the case of the exemplary embodiment, data indicating an image of a document (hereinafter represented as a document image) for advertising a product of the company A is stored in the hard disk 2d. FIG. 2 is a diagram showing an example of a document image. In the case of the exemplary embodiment, the document image is a bitmap image. A marker area 8a which is a concentric area is set in the document image. The document image is printed together with a marker image (not shown) that is a semitransparent ring image showing the contour of the marker area 8a. Coordinate axes (not shown) are set in the document image. A position and a range in the document image are designated by the coordinates of the coordinate axes.

A database is stored in the hard disk 2d. The marker area 8a, set in the document image, is registered in the database. FIG. 3 is a diagram sowing an example of content stored in the database. As shown in FIG. 3, information indicating each marker area 8a set in a document image is stored in the database. That is, the database includes a marker area field. Information indicating each marker area 8a is stored in the marker area field. Here, the radius r and the center point P of each marker area 8a are stored in the marker area field. Also, in association with each marker area 8a set in a document image, a feature amount indicating an image feature of the document image in that marker area 8*a* is stored in the database. That is, the database includes a feature amount field. A feature amount is stored in the feature amount field. Here, one or multiple feature points extracted from each marker area 8*a* by a scale-invariant feature transform (SIFT) algorithm are stored as a feature amount in the feature amount field. Also, in association with each marker area 8*a* set in a document image, the uniform resource locator (URL) of web content (such as a moving image relating to the product of the company A) relating to a display element in that marker area 8*a* is stored in the database. That is, the database includes a link data field. A URL is stored in the link data field. A URL corresponds to "address information".

Since only one marker area 8*a* is set in FIG. 2, as shown in FIG. 3, only one marker area is registered in the database.

A status flag indicating the status of a document image is also stored in the hard disk 2*d*. The value "0" of the status flag indicates that the document image is in a test issued status. The test issued status is a status in which a printed matter of the document image is distributed only within the company A. When the document image is in the test issued status, a marker area 8*a* set in the document image is allowed to be changed. "Change" includes updating and deletion. The value "1" of the status flag indicates that the document image is in an issued status. The issued status is a status in which a printed matter of the document image is widely distributed throughout the public. A marker area 8*a* set in the document image is prohibited from being changed.

The server 2 has a web server function. When the user U1 wants to set a marker area 8*a* in a document image, the user U1 accesses the server 2 with the information terminal 4. That is, when the user U1 accesses the server 2 with the information terminal 4, the document image and the coordinates of the center point P and the radius r of the marker area 8*a* are sent by the controller 2*a* (display controller) to the information terminal 4. On the information terminal 4 (display), which has received the document image and the coordinates of the center point P and the radius r of the marker area 8*a*, the document image is displayed together with the above-described marker image on a browser. After inputting the URL of web content, the user U1 refers to the document image displayed on the browser and firstly executes a designating operation. Accordingly, the user U1 designates an area in which the user U1 wants to set the marker area 8*a* in the document image. For example, the user U1 designates an area to be associated with the web content. Specifically, in the designating operation, the user U1 designates a position in the document image by using an operation unit such as a mouse. Accordingly, the user U1 designates a concentric area having a prescribed radius around the designated position.

Figure 4:
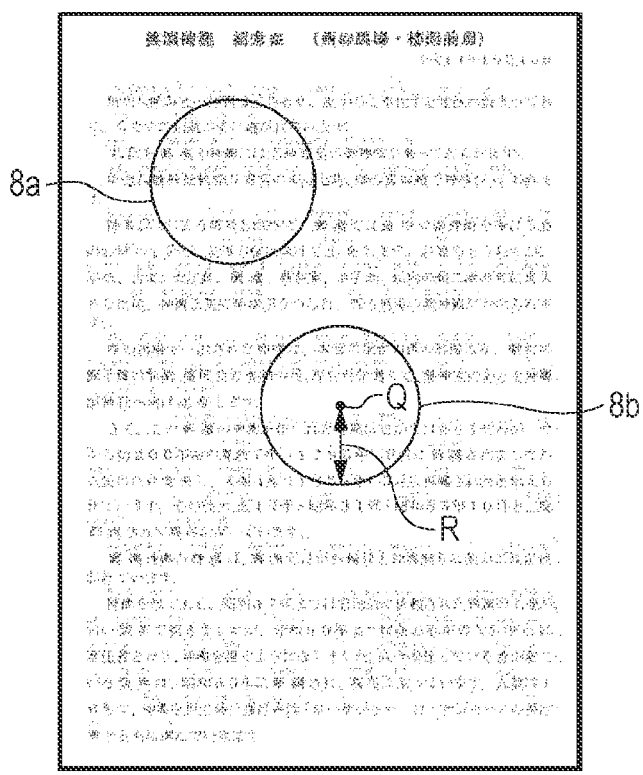
FIG. 4 is a diagram showing an example of a document image in the case where a designated marker area is designated.
Figure 5:
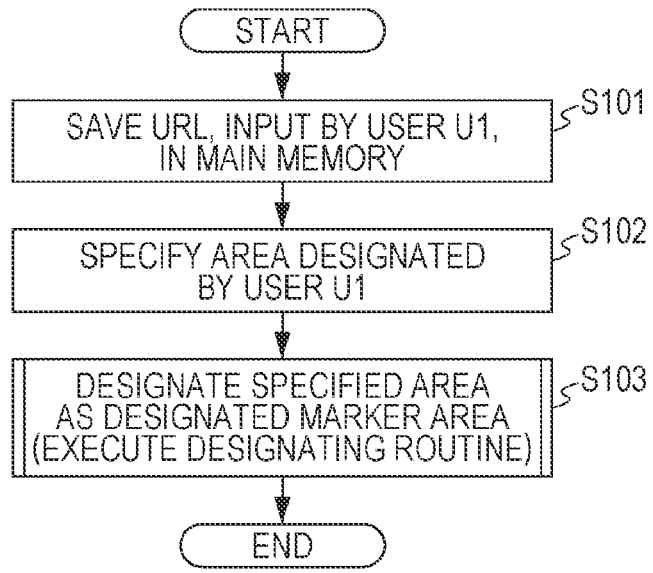
FIG. 5 is a flowchart showing a process executed by the server.

The area designated by the designating operation is designated as a designated marker area 8*b*, and a designated marker image (not shown) that is a semitransparent ring image showing the contour of the designated marker area 8*b* is displayed on the information terminal 4. FIG. 4 shows an example of a document image in the case where the designated marker area 8*b* is designated. A point Q indicates the center of the designated marker area 8*b*. Specifically, when the designating operation is performed, the URL input by the user U1 and the coordinates of the position designated by the user U1 are sent to the server 2. The server 2, which has received the URL and the coordinates of the designated position, executes a process shown in a flowchart in FIG. 5.

That is, the controller 2*a* saves the URL input by the user U1 in the main memory 2*b* (S101). Also, the controller 2*a* specifies an area designated by the user U1 on the basis of the coordinates of the position designated by the user U1 (S102). Specifically, in step S102, the controller 2*a* specifies a circular area with a prescribed radius around the position designated by the user U1.

The controller 2*a* executes a designating routine (S103). Although details of the designating routine will be described later, in the designating routine, the controller 2*a* (designating unit) designates in principle the area specified in step S102 as a designated marker area 8*b* (designated area). Specifically, in the designating routine, the controller 2*a* saves the coordinates of the position designated by the user U1, in other words, the coordinates of the center of the area specified in step S102, as the coordinates of the center Q of the designated marker area 8*b* in the main memory 2*b*. Also, the controller 2*a* saves the radius of the area specified in step S102, that is, the prescribed radius, as the radius R of the designated marker area 8*b* (see FIG. 4) in the main memory 2*b*.

The center Q and the radius R of the designated marker area 8*b* are sent by the controller 2*a* (display controller) to the information terminal 4 of the user U1. On the information terminal 4, which has received the center Q and the radius R of the designated marker area 8*b*, the above-described designated marker image is displayed. The designated marker image is a semitransparent ring image showing the contour of the designated marker area 8*b*.

Figure 6:
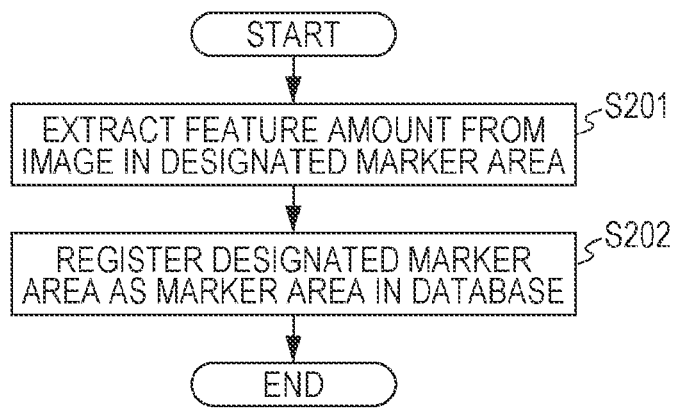
FIG. 6 is a flowchart showing a process executed by the server.

The user U1, who has designated the area by performing the designating operation, performs a registering operation when the user U1 wants to set the designated area as a marker area. For example, the user U1 clicks a certain button. When the registering operation is performed, a registering instruction is sent to the server 2. The server 2, which has received the registering instruction, executes a process shown in a flowchart in FIG. 6. With this process, the designated marker area 8*b* is set as the marker area 8*a* and is registered in the database.

That is, the controller 2*a* reads the center Q and the radius R of the designated marker area 8*b* from the main memory 2*b*, and extracts a feature amount indicating an image feature of the document image in the designated marker area 8*b* (S201). In the exemplary embodiment, in step S201, the controller 2*a* extracts, as a feature amount, one or multiple feature points from an image in the designated marker area 8*b* in accordance with the SIFT algorithm.

Also, the controller 2*a* (registering unit) registers, in the database, the designated marker area 8*b* as the marker area 8*a* in association with the feature amount extracted in step S201 and the URL saved in the main memory 2*b* (S202). That is, in step S202, the controller 2*a* adds a new record to the database, stores the coordinates of the center Q of the designated marker area 8*b* as the coordinates of the center P of the marker area 8*a* in the marker area field of the added record, and stores the radius R of the designated marker area 8*b* as the radius r of the marker area 8*a* in the marker area field of the added record. Also, the controller 2*a* stores the feature amount, extracted in step S201, in the feature amount field of the added record. Also, the controller 2*a* stores the URL, saved in the main memory 2*b*, in the link data field of the added record.

In this manner, the designated marker area 8*b* is set as the marker area 8*a*. Note that the designated marker image becomes the marker image.

Ideas for efficiently advertising the product of the company A to the user U2 who has obtained the printed matter of the document image are put to practice in the server 2. That is, when the user U2 who has obtained the printed matter focuses a digital camera included in the mobile terminal 6 on the marker image and captures an image of an area including the marker image, web content relating to a display element (such as a product) in an area in the marker image (that is, the marker area 8a) is automatically displayed on the mobile terminal 6. More specifically, when the user U2 captures an image of an area including the marker image, with the above-described application, an image of the marker area is cut out from the captured image as a search target image, and data indicating the search target image is sent to the server 2. The server 2, which has received the data, executes a process shown in FIG. 7.

That is, firstly the controller 2a extracts one or multiple feature points as a feature amount indicating an image feature of the search target image in accordance with the SIFT algorithm (S301).

For each feature amount stored in the database, the controller 2a calculates the degree of similarity with the feature amount extracted from the search target image (S302). In the exemplary embodiment, in step S302, the controller 2a compares each feature point represented by each feature amount stored in the database with each feature point extracted from the search target image, and calculates the number of combinations of feature points having a corresponding relationship with each other as the degree of similarity.

The controller 2a specifies, among feature amounts stored in the database, a feature amount whose degree of similarity with the feature amount extracted from the search target image is greater than or equal to a threshold (S303), and sends a URL associated with the specified feature amount to the mobile terminal 6 (S304). For example, in step S304, the controller 2a sends a URL associated with, among feature amounts specified in step S303, a feature amount with the maximum degree of similarity with the feature amount extracted from the search target image to the mobile terminal 6. The mobile terminal 6, which has received the URL, obtains web content at the link destination represented by the URL, and outputs the obtained web content (such as a moving image relating to the product of the A company).

Figure 8A:
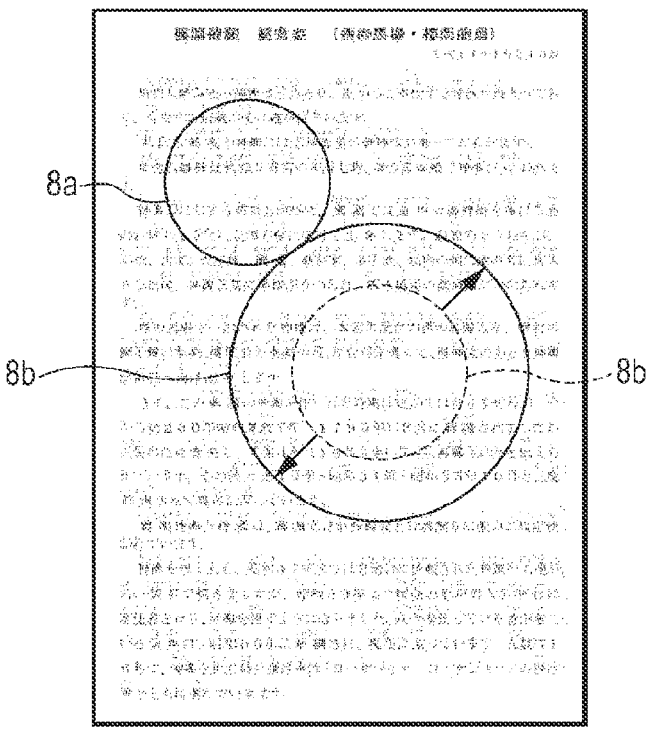
FIG. 8A is a diagram showing enlargement of the designated marker area.
Figure 8B:
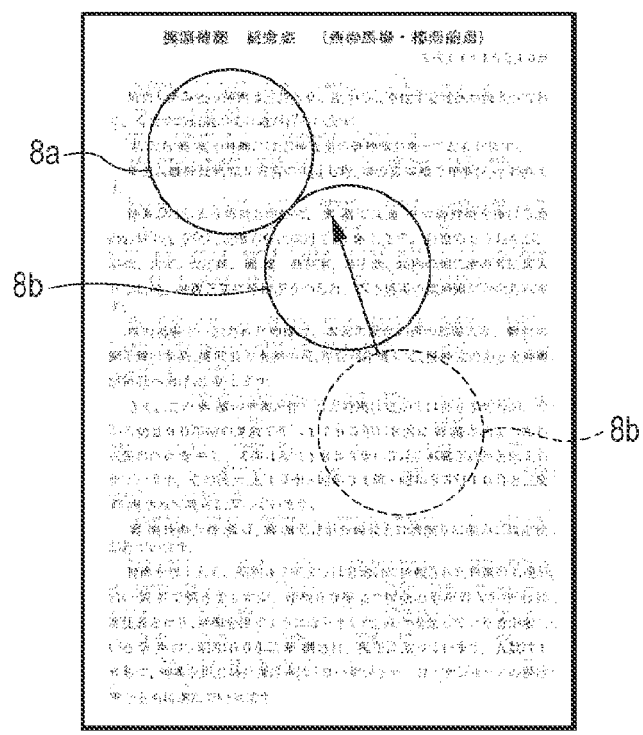
FIG. 8B is a diagram showing movement of the designated marker area.

If the user U1 is dissatisfied with the designated marker area 8b, the user U1 may update the designated marker area 8b by performing an updating operation before a registering operation. For example, the user U1 enlarges the designated marker area 8b by performing an enlargement operation, which is one type of updating operation. FIG. 8A shows enlargement of the designated marker area 8b in response to an enlargement operation. Alternatively, for example, the user U1 moves the designated marker area 8b by performing a movement operation, which is one type of updating operation. FIG. 8B shows movement of the designated marker area 8b in response to a movement operation.

Specifically, when an updating operation is performed, an updating instruction is sent to the server 2. The server 2, which has received the updating instruction, executes a process shown in a flowchart in FIG. 9.

That is, the controller 2a (updating unit) reads the center Q and the radius R from the main memory 2b, and, on the basis of the center Q and the radius R, specifies a candidate area serving as a candidate for the updated designated marker area 8b (S401). Specifically, when an enlargement operation is performed, in step S401, the controller 2a calculates the radius of the candidate area on the basis of the radios R read from the main memory 2b. For example, the controller 2a calculates the radius of the candidate area by adding a certain value ΔR to the radius R. Alternatively, when a movement operation is performed, in step S401, the controller 2a calculates the coordinates of the center of the candidate area on the basis of the center Q read from the main memory 2b. For example, the controller 2a calculates, as the center of the candidate area, the coordinates of a position displaced from the center Q by a certain distance in a direction designated by the user U1.

The controller 2a executes an updating routine (S402). Although details of the updating routine will be described later, in the updating routine, the controller 2a (updating unit) updates in principle the designated marker area 8b to the candidate area. Specifically, in the updating routine, when an enlargement operation is performed, the controller 2a updates the radius R of the designated marker area 8b, stored in the main memory 2b, to the radius of the candidate area, calculated in step S401. Alternatively, when a movement operation is performed, the controller 2a updates the coordinates of the center Q of the designated marker area 8b, stored in the main memory 2b, to the coordinates of the center of the candidate area, calculated in step S401.

Figure 7:
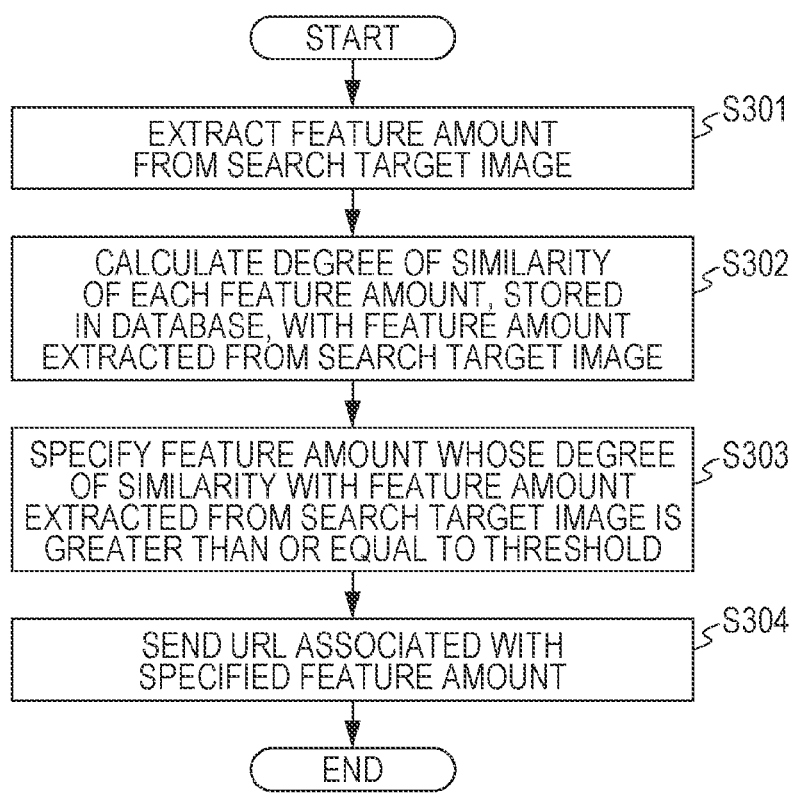
FIG. 7 is a flowchart showing a process executed by the server.

By the way, if two marker areas 8a that at least partially overlap each other are set, similar feature amounts of the two marker areas 8a may be saved in the database. Therefore, if two marker areas 8a that at least partially overlap each other are set, when the process shown in FIG. 7 is performed, web content different from web content that should be originally output may be output.

Figure 9:
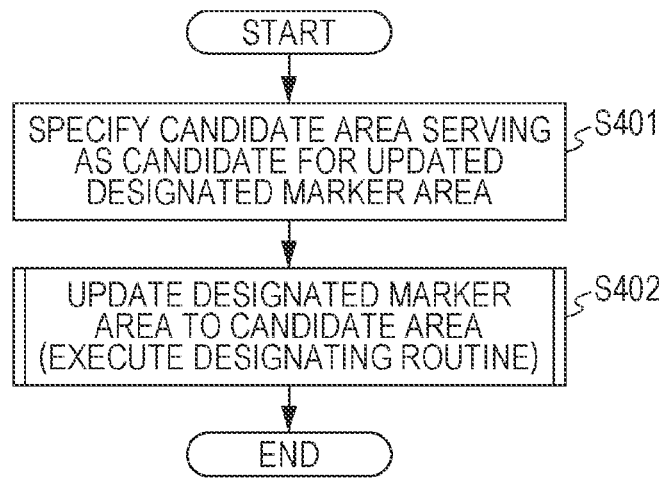
FIG. 9 is a flowchart showing a process executed by the server.

With regard to this point, the server 2 may be prohibited from updating a designated marker area 8b that at least partially overlaps a marker area 8a in the updating routine (see FIG. 9). The server 2 may also be prohibited from designating a designated marker area 8b that at least partially overlaps a marker area 8a in the designating routine (see FIG. 5). Hereinafter, this point in the updating routine and the designating routine will be described in this order.

Figure 10:
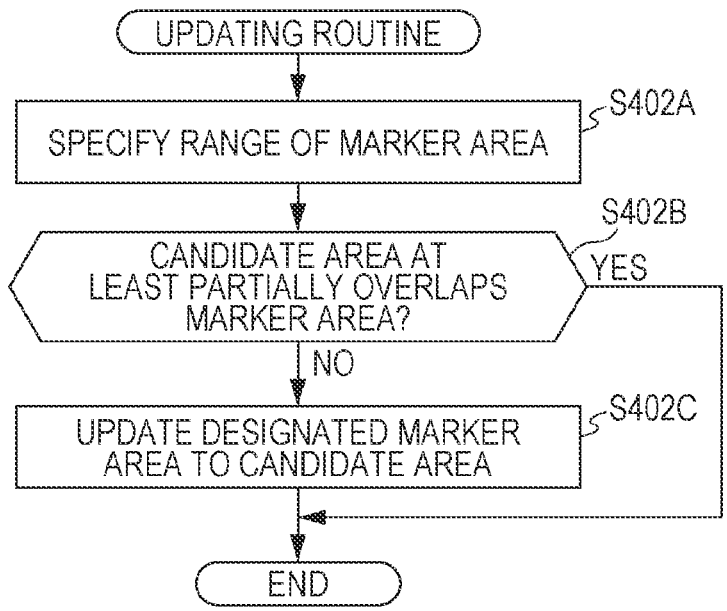
FIG. 10 is a flowchart showing a process executed by the server in an updating routine.

FIG. 10 is a flowchart showing a process executed by the server 2 in the updating routine. Firstly, the controller 2a (updating unit) specifies the range of a marker area 8a registered in the database (S402A). Specifically, in step S402A, the controller 2a specifies the range of a marker area 8a on the basis of data stored in the marker area field (see FIG. 3).

The controller 2a (updating unit) determines whether a candidate area at least partially overlaps the marker area 8a (S402B). Here, the fact that "a candidate area at least partially overlaps the marker area 8a" means that "the candidate area overlaps a predetermined area or an area larger than that of the marker area 8a". More specifically, this means that "the number of pixels in an overlapping portion between the candidate area and the marker area 8a is greater than or equal to a predetermined reference number". Here, the reference number is an integer greater than or equal to "0".

When the candidate area at least partially overlaps the marker area 8a (Y in S402B), the controller 2a (updating unit) does not update the designated marker area 8b to the candidate area. On the other hand, when the candidate area does not at least partially overlap the marker area 8a (N in S402B), the controller 2a (updating unit) updates the designated marker area 8b to the candidate area (S402C). For example, when the reference number is "0", a prohibition is implemented that no area of the designated marker area 8b shall overlap the marker area 8a. In step S402C, the controller 2a sends the center Q and the radius R of the updated designated marker area 8b in order to update the position or size of the designated marker image involved in updating of the designated marker area 8b.

In this manner, updating the designated marker area 8b to at least partially overlap the marker area 8a is prohibited.

Figure 11:
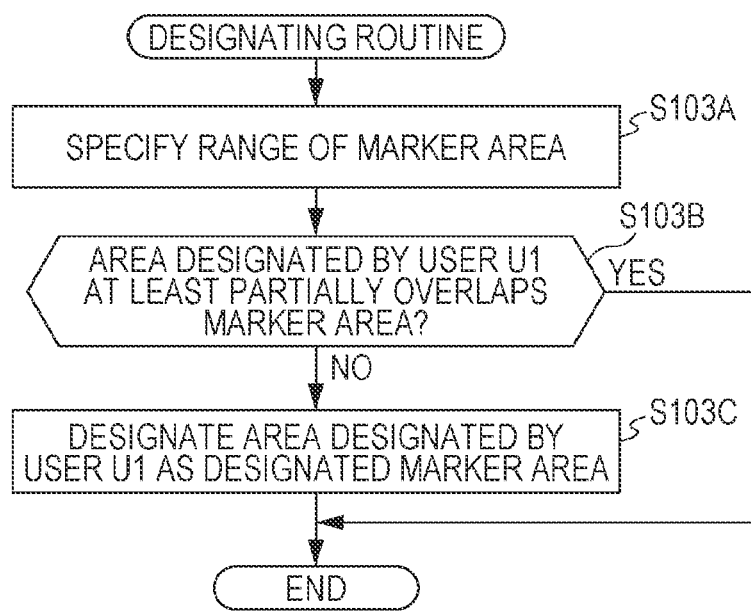
FIG. 11 is a flowchart showing a process executed by the server in a designating routine.

Next, the designating routine will be described. FIG. 11 is a flowchart showing a process executed by the server 2 in the designating routine. Firstly the controller 2a (designating unit) specifies the range of a marker area 8a registered in the database, as in step S402A (see FIG. 10) (S103A).

The controller 2a (designating unit) determines whether the area designated by the user U1, which is specified in step S102, at least partially overlaps the marker area 8a (S103B). Here, the fact that "the area designated by the user U1 at least partially overlaps the marker area 8a" means that "the area designated by the user U1 overlaps a predetermined area or an area larger than that of the marker area 8a". More specifically, this means that "the number of pixels in an overlapping portion between the area designated by the user U1 and the marker area 8a is greater than or equal to the above-described reference number".

When the area designated by the user U1 at least partially overlaps the marker area 8a (Y in S103B), the controller 2a (designating unit) does not designate the area designated by the user U1 as the designated marker area 8b. On the other hand, when the area designated by the user U1 does not at least partially overlap the marker area 8a (N in S103B), the controller 2a (designating unit) designates the area designated by the user U1 as the designated marker area 8b (S103C). That is, in step S103C, the controller 2a saves the coordinates of the center of the area designated by the user U1 as the coordinates of the center Q of the designated marker area 8b in the main memory 2b, and saves the prescribed radius as the radius R of the designated marker area 8b in the main memory 2b. For example, when the reference number is "0", a prohibition is implemented that no area of the designated marker area 8b shall overlap the marker area 8a.

In this manner, designating the designated marker area 8b to at least partially overlap the marker area 8a is prohibited.

By the way, even when two marker areas 8a that at least partially overlap each other are set, if the document image is in the test issued status, for example, one of the marker areas 8a is allowed to be changed. Thus, even when two marker areas 8a that at least partially overlap each other are set, if the document image is in the test issued status, there will be no great problem.

When the candidate area at least partially overlaps the marker area 8a (Y in S402B), if the status is such that the marker area 8a is allowed to be changed, the controller 2a may not update the designated marker area 8b. That is, when the candidate area at least partially overlaps the marker area 8a (Y in S402B), the controller 2a determines, on the basis of the above-described status flag, whether the status is such that the marker area 8a is prohibited from being changed, that is, whether the document image is in the issued status. When the document image is in the issued status, the controller 2a ends the updating routine without updating the designated marker area 8b. When the status is such that the marker area 8a is prohibited from being changed, the controller 2a may execute step S402C.

The exemplary embodiment of the invention is not limited to that described above.

(1) For example, although the designated marker area 8b is a concentric area in the above description, the designated marker area 8b may have any shape. That is, the marker area 8a may have any shape. For example, the designated marker area 8b may be a rectangle circumscribed about a circular area with the radius R around the center Q, and the marker area 8a may be a rectangle circumscribed about a circular area with the radius r around the center P. Also, the designated marker image may not necessarily coincide with the contour of the designated marker area 8b. For example, when the designated marker area 8b is a rectangle circumscribed about a circular area with the radius R around the center Q, an image showing the contour of the circular area may serve as the designated marker image. Also, the marker image may not necessarily coincide with the contour of the marker area 8a. For example, when the marker area 8a is a rectangle circumscribed about a circular area with the radius r around the center P, an image showing the contour of the circular area may serve as the marker image.

(2) Also, for example, the "address information" is not limited to web content, and the "address information" may be any information as long as it is data indicating the address of any information resource. For example, the "address information" may be a file path of content. Alternatively, the "address information" may be content itself, such as web content.

Figure 12A:
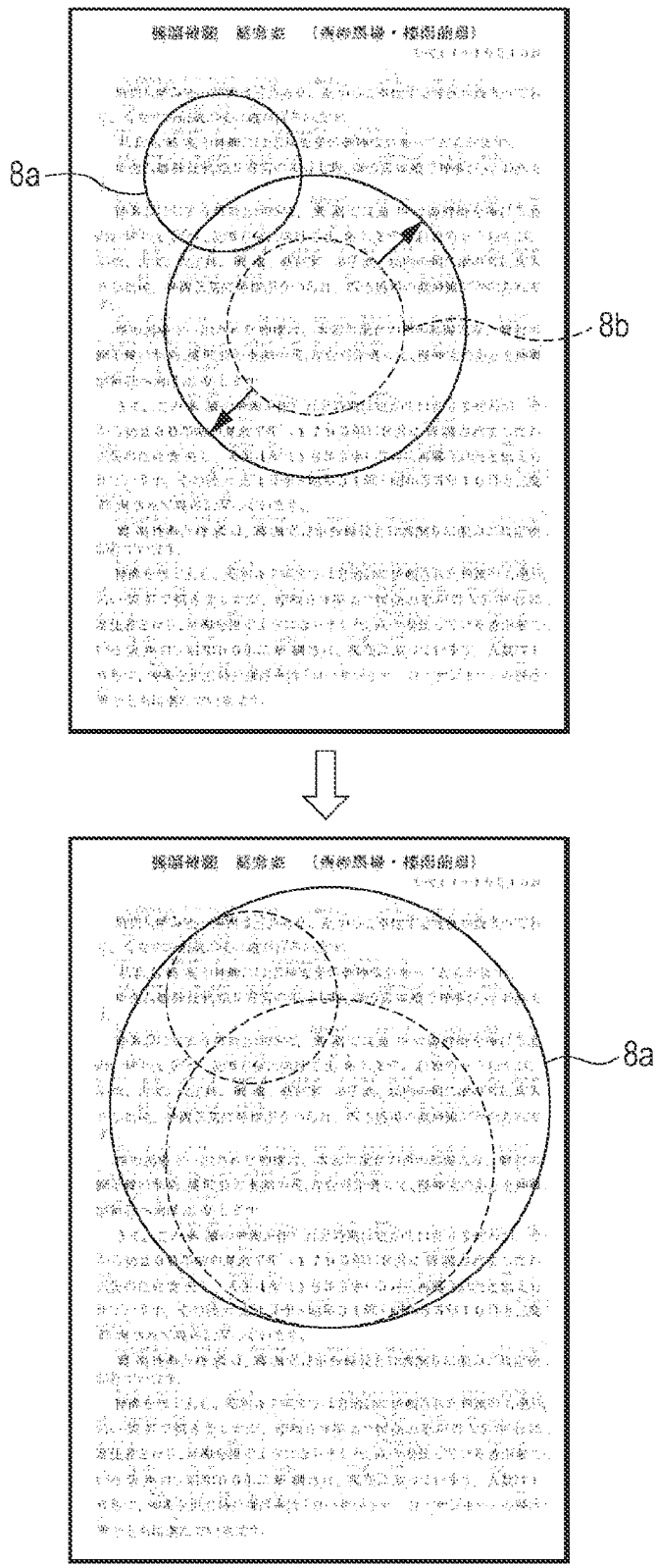
FIG. 12A is a diagram showing updating of a marker area.
Figure 12B:
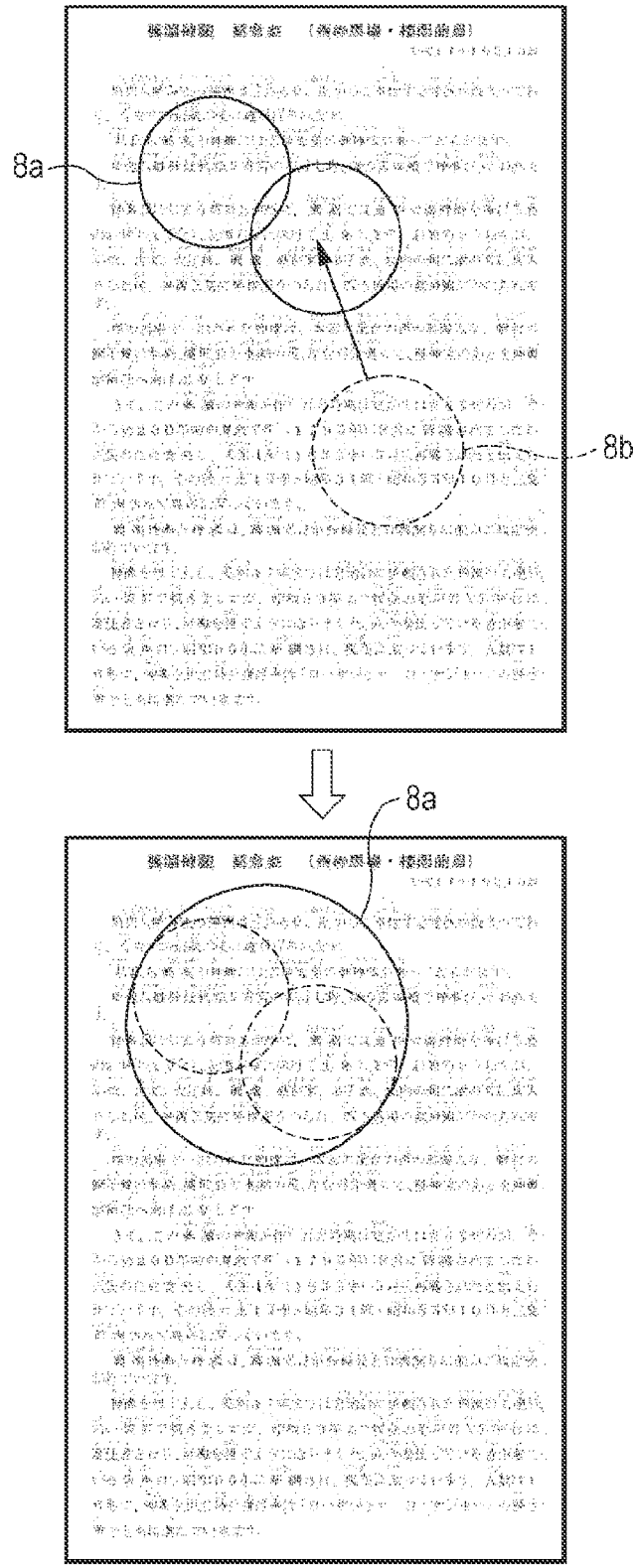
FIG. 12B is a diagram showing updating of the marker area.

(3) Also, for example, when many marker areas 8a are set, if the marker images thereof are displayed, it becomes visually complicated, and a great amount of data is stored in the database. When the candidate area at least partially overlaps one of the marker areas 8a (Y in S402B), the controller 2a may update the marker area 8a to an area including the candidate area. For example, as shown in FIG. 12A, when the candidate area at least partially overlaps the marker area 8a as a result of an enlargement operation, or, as shown in FIG. 12B, when the candidate area at least partially overlaps the marker area 8a as a result of a movement operation, the controller 2a may update the marker area 8a to an area including the candidate area, while deleting the designated marker area 8b.

Figure 13:
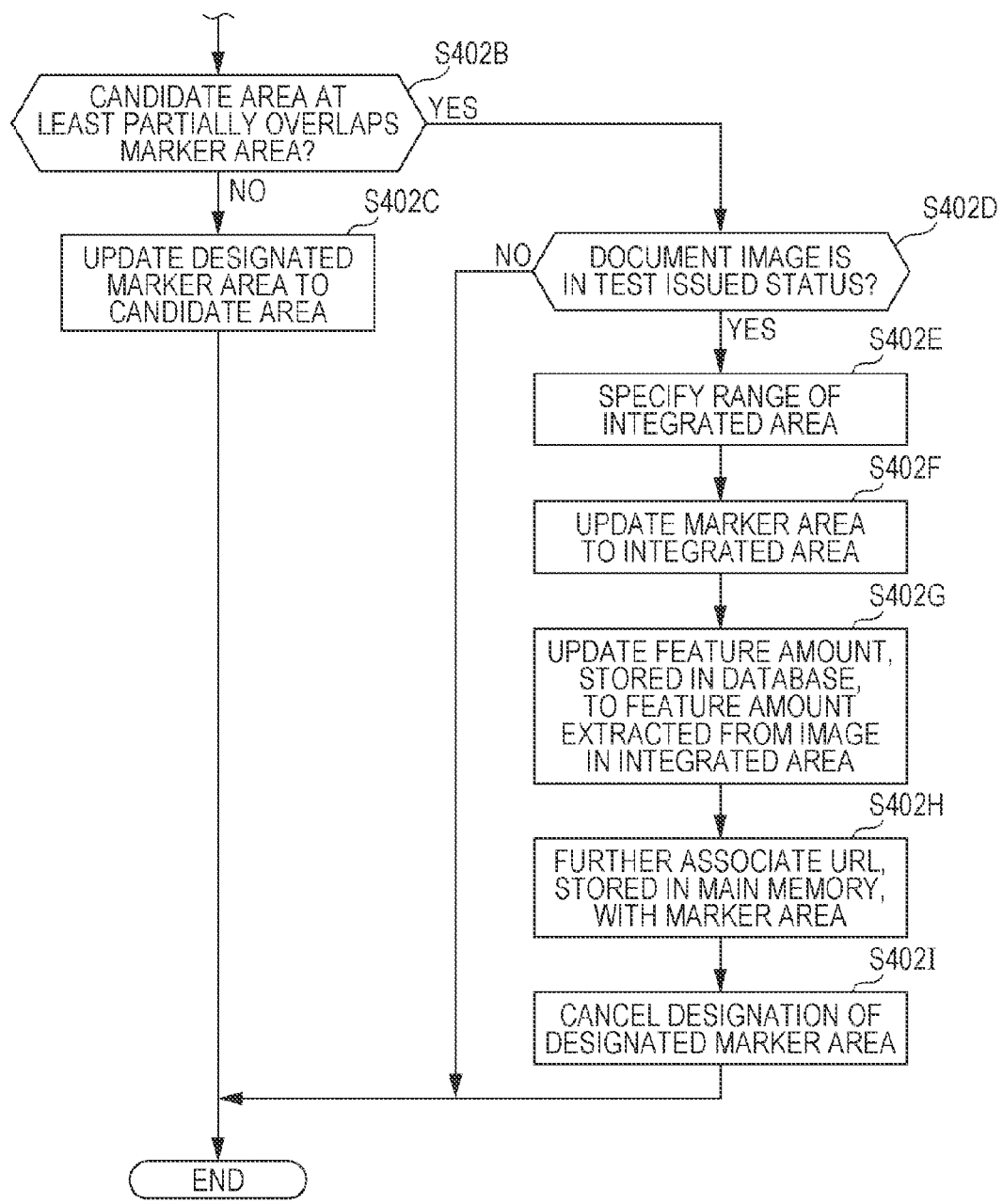
FIG. 13 is a flowchart showing a process executed by the server in the updating routine.

Specifically, as described above, the marker area 8a is allowed to be changed only when the status is such that changing of the marker area 8a is allowed. When the candidate area at least partially overlaps the marker area 8a (Y in S402B), if the status is such that changing of the marker area 8a is allowed (that is, the document image is in the test issued status), the controller 2a may update the marker area 8a. For example, in the updating routine shown in FIG. 10, when the candidate area at least partially overlaps the marker area 8a (Y in S402B), the controller 2a may additionally execute a process shown in FIG. 13.

That is, the controller 2a determines whether the status is such that changing of the marker area 8a is allowed, that is, the document image is in the test issued status (S402D). That is, in step S402D, the controller 2a determines whether the value of the above-described status flag is "0". When the document image is in the issued status (N in S402D), the controller 2a ends the updating routine since the status is such that changing of the marker area 8a is prohibited.

In contrast, when the document image is in the test issued status (Y in S402D), the controller 2a executes steps from step S402E onward. That is, the controller 2a (specifying unit) firstly specifies the range of an integrated area that is a circular area circumscribed about the marker area 8a and the candidate area (S402E). Specifically, in step S402E, the controller 2a calculates the center and the radius of the integrated area. The integrated area may be any area as long as it is an area including the marker area 8a and the candidate area.

The controller 2a updates the marker area 8a to the integrated area (S402F). Specifically, in step S402F, the controller 2a updates the coordinates of the center P of the marker area 8a, stored in the marker area field, to the coordinates of the center of the integrated area, and updates the radius r of the marker area 8a to the radius of the integrated area. In step S402F, to update the marker image, which is involved in updating of the marker area 8a, the controller 2a also sends the center P and the radius r of the updated marker area 8a to the information terminal 4.

Also, the controller 2a extracts, as a feature amount, one or multiple feature points from an image in the integrated area by using the SIFT algorithm, and updates the feature amount stored in the feature amount field (see FIG. 3) to the extracted feature amount (S402G). Also, the controller 2a (associating unit) additionally stores the URL, stored in the main memory 2b, in the link data field (S402H). Accordingly, the controller 2a further associates the URL, stored in the main memory 2b, with the marker area 8a.

To delete the designated marker image displayed on the information terminal 4, the controller 2a (cancelling unit) cancels designation of the designated marker area 8b (S402I). Specifically, in step S402I, it is only necessary for the controller 2a to simply delete the coordinates of the center Q and the radius R of the designated marker area 8b from the main memory 2b.

(4) Also, for example, instead of setting the status in units of documents, the status may be set in units of marker areas 8a. That is, the status indicating whether changing is prohibited may be set for each marker area 8a registered in the database. For example, instead of the above-described status flag, data specifying whether each marker area 8a registered in the database is allowed to be changed may be stored in the hard disk 2d. For example, when changing is prohibited prior to an expiration date and changing is allowed after the expiration date, the expiration date of each marker area 8a may be stored as the above-described data in the hard disk 2d. In this case, when the candidate area at least partially overlaps the marker area 8a (Y in S402B), the controller 2a may determine, on the basis of the above-described data, whether the marker area 8a is allowed or prohibited from being changed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to execute:
a display controller that displays, on a display, an image showing a designated area,
wherein the designated area is designated by a user in an image being processed;
an updating unit that, in response to an updating operation being performed by the user instructing an update to the designated area, specifies a candidate area of the image being processed for updating the designated area to the specified candidate area; and
a registering unit that registers the designated area in a database in response to a registering operation performed by the user,
wherein the updating unit, in response to the at least part of the specified candidate area covering a prohibited area of the image being processed, wherein the prohibited area is registered in the database, prohibits updating the designated area to the specified candidate area.

2. The information processing apparatus according to claim 1, wherein the updating unit, in response to changing of the prohibited area registered in the database being prohibited, and at least part of the specified candidate area covering the prohibited area registered in the database, prohibits updating the designated area to the specified candidate area.

3. The information processing apparatus according to claim 1,
wherein the registering unit registers, in response to the registering operation, the designated area in the database in association with address information, input by the user, of an information resource and a feature amount indicating an image feature in the designated area, and
wherein the updating unit includes:
a canceling unit that cancels designation of the designated area in response to at least part of the specified candidate area covering an area registered in the database;
a specifying unit that specifies an integrated area including the area registered in the database and the specified candidate area in response to at least part of the specified candidate area covering area or an area larger than the predetermined registered in the database;
an area updating unit that updates an update area registered in the database to the integrated area in response to at least part of the specified candidate area covering the area registered in the database;
a feature updating unit that updates a feature amount associated with the update area registered in the database to a feature amount indicating an image feature in the integrated area in response to at least part of the specified candidate area covering the area registered in the database; and
an associating unit that further associates address information input by the user with the update area registered in the database in response to at least part of the specified candidate area covering the predetermined area registered in the database.

4. The information processing apparatus according to claim 3,
wherein, in response to at least part of the specified candidate area covering the area registered in the database, the canceling unit cancels designation of the designated area if changing of the area registered in the database is not prohibited,
wherein, in response to at least part of the specified candidate area covering the area registered in the database, the area updating unit updates the update area registered in the database to the integrated area if the image being processed is in a predetermined status,
wherein, in response to at least part of the specified candidate area covering the area registered in the database, the feature updating unit updates the feature amount associated with the update area registered in the database to the feature amount indicating the image feature in the integrated image if changing of the area registered in the database is not prohibited, and
wherein, in response to at least part of the specified candidate area covering the area registered in the database, the associating unit further associates the address information input by the user with the update area registered in the database if changing of the area registered in the database is not prohibited.

5. The information processing apparatus according to claim 1, further comprising a designating unit that, in response to an area in the image being processed being designated by the user, designates the area designated by the user as the designated area,
wherein the designating unit, in response to at least part of the area designated by the user covering a non-designate area registered in the database, prohibits designating the area designated by the user as the designated area.

6. The information processing apparatus according to claim 2, further comprising a designating unit that, in response to an area in the image being processed being designated by the user, designates the area designated by the user as the designated area,
   wherein the designating unit, in response to at least part of the area designated by the user covering a non-designate area registered in the database, prohibits designating the area designated by the user as the designated area.

7. The information processing apparatus according to claim 3, further comprising a designating unit that, in response to an area in the image being processed being designated by the user, designates the area designated by the user as the designated area,
   wherein the designating unit, in response to at least part of the area designated by the user covering a non-designate area registered in the database, prohibits designating the area designated by the user as the designated area.

8. The information processing apparatus according to claim 4, further comprising a designating unit that, in response to an area in the image being processed being designated by the user, designates the area designated by the user as the designated area,
   wherein the designating unit, in response to at least part of the area designated by the user covering a non-designate area registered in the database, prohibits designating the area designated by the user as the designated area.

9. A non-transitory computer readable medium storing a program causing a computer to execute a process, the process comprising:
   displaying, on a display, an image showing a designated area,
      wherein the designated area is designated by a user in an image being processed;
   in response to an updating operation being performed by the user instructing an update to the designated area, specifying a candidate area of the image being processed for updating the designated area to the specified candidate area;
   registering the designated area in a database in response to a registering operation performed by the user; and
   in response to at least part of the specified candidate area covering a prohibited area of the image being processed, wherein the prohibited area is registered in the database, prohibiting updating the designated area to the specified candidate area.

10. An information processing method comprising:
    displaying, on a display, an image showing a designated area,
       wherein the designated area is designated by a user in an image being processed;
    in response to an updating operation being performed by the user instructing an update to the designated area, specifying a candidate area of the image being processed for updating the designated area to the specified candidate area;
    registering the designated area in a database in response to a registering operation performed by the user; and
    in response to at least part of the specified candidate area covering a prohibited area of the image being processed, wherein the prohibited area is registered in the database, prohibiting updating the designated area to the specified candidate area.

* * * * *